(12) United States Patent
Choi et al.

(10) Patent No.: US 8,003,275 B2
(45) Date of Patent: Aug. 23, 2011

(54) MONOPOLAR MEMBRANE-ELECTRODE ASSEMBLY

(75) Inventors: Kyoung Hwan Choi, Suwon-si (KR); Jae-yong Lee, Seongnam-si (KR); Jin-ho Kim, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1323 days.

(21) Appl. No.: 11/438,270

(22) Filed: May 23, 2006

(65) Prior Publication Data

US 2006/0269829 A1    Nov. 30, 2006

(30) Foreign Application Priority Data

May 24, 2005 (KR) .......................... 10-2005-0043741
May 15, 2006 (KR) .......................... 10-2006-0043466

(51) Int. Cl.
H01M 4/86    (2006.01)
(52) U.S. Cl. ......... 429/483; 429/465; 429/522; 429/532
(58) Field of Classification Search .................. 429/483, 429/465, 522, 532
See application file for complete search history.

(56) References Cited

U.S. PATENT DOCUMENTS

| | | | |
|---|---|---|---|
| 6,410,180 | B1 | 6/2002 | Cisar et al. |
| 6,689,502 | B2 | 2/2004 | Choi |
| 2002/0132151 | A1 | 9/2002 | Choi |
| 2003/0198853 | A1* | 10/2003 | Choi et al. ....................... 429/32 |
| 2006/0014065 | A1 | 1/2006 | Pawlik et al. |
| 2006/0134500 | A1 | 6/2006 | Marsacq et al. |

FOREIGN PATENT DOCUMENTS

| | | |
|---|---|---|
| CN | 1355573 | 6/2002 |
| EP | 1 241 725 A2 | 9/2002 |
| EP | 1 357 627 A2 | 10/2003 |
| JP | 2002-280016 | 9/2002 |
| JP | 2003-197225 | 7/2003 |
| JP | 2003-323902 | 11/2003 |
| JP | 2004-146092 | 5/2004 |
| JP | 2004-327072 | 11/2004 |
| JP | 2005-50817 | 2/2005 |
| JP | 2005-209463 | 8/2005 |
| JP | 2006-86045 | 3/2006 |

(Continued)

OTHER PUBLICATIONS

Japanese Office Action issued Mar. 16, 2010, in corresponding Japanese Patent Application No. 2006-144226.

(Continued)

Primary Examiner — Jane Rhee
(74) Attorney, Agent, or Firm — Christie, Parker & Hale, LLP

(57) ABSTRACT

A monopolar membrane-electrode assembly, including an electrolyte membrane having a plurality of cell regions and at least one opening associated with each cell region, a plurality of anode current collecting bodies and a plurality of cathode current collecting bodies respectively formed at the cell regions on both surfaces of the electrolyte membrane, each current collecting body including a current collector collecting the currents on the cell regions, and a conductor connected to a side of the current collector, respective ends of the conductors of corresponding anode and cathode current collecting bodies being connected through the corresponding openings in series, and a plurality of anodes and a plurality of cathodes respectively formed on the anode current collecting bodies and the cathode current collecting bodies.

23 Claims, 11 Drawing Sheets

FOREIGN PATENT DOCUMENTS

| | | |
|---|---|---|
| JP | 2006-93119 | 4/2006 |
| JP | 2006-156034 | 6/2006 |
| WO | WO 02/059998 A2 | 8/2002 |
| WO | WO 03/088398 A1 | 10/2003 |
| WO | WO 2004/015797 | 2/2004 |
| WO | WO 2005/015669 | 2/2005 |
| WO | WO 2005/045970 | 5/2005 |

OTHER PUBLICATIONS

Office Action issued Mar. 7, 2008 by the Patent Office of the People's Republic of China re: Chinese Application No. 2006100898320 (16 pp).

Search Report issued in European Paten Application No. 06252673.6 on Oct. 2, 2006.

* cited by examiner

MONOPOLAR MEMBRANE-ELECTRODE ASSEMBLY

CROSS-REFERENCE TO RELATED PATENT APPLICATIONS

This application claims the benefit of Korean Patent Applications No. 2005-43741 filed May 24, 2005, and No. 2006-43466 filed May 15, 2006, in the Korean Intellectual Property Office, the disclosures of which are incorporated herein in their entireties by reference.

BACKGROUND OF THE INVENTION

1. Field of the Invention

Aspects of the present invention relate to a monopolar direct liquid fuel cell used as an electric power for use with portable electronic appliances, and, more particularly, to a monopolar membrane-electrode assembly, in which a current collecting body is disposed on an upper portion or a lower portion of a catalyst layer.

2. Description of the Related Art

A direct methanol fuel cell (DMFC) generates electricity through a chemical reaction between methanol which is a fuel and oxygen which is an oxidizing agent and has high energy density and current density. The DMFC has advantages in that a periphery device, such as a fuel reformer, is not required since methanol is directly fed to the DMFC and storing and supplying of the liquid fuel may be performed easily.

A monopolar type DMFC may be manufactured to a relatively thin and small DMFC size since the thickness and volume of the DMFC may be reduced by connecting cells in series after a plurality of cells are arranged on one electrolyte sheet.

U.S. Pat. No. 6,410,180 discloses a mesh type current collector disposed on an electrode and a conductor that connects the current collectors. However, there is a step difference between the electrode and the current collector since the current collector is disposed on the electrode. Therefore, there is a risk of a leak of liquid fuel and a risk that the leaked liquid fuel may flow along the conductive material. Also, an efficiency of the DMFC may be reduced due to the increase in the contact resistance between the conductor and the electrode and the increase in the resistance that occurs while electrons generated in the catalyst layer migrate into the current collector through a fuel diffusion portion and a supporting member of the electrode.

SUMMARY OF THE INVENTION

Aspects of the present invention provide a monopolar membrane-electrode assembly that minimizes electrical resistance by disposing a current collecting body between an electrode and a membrane. Aspects of the present invention also provide a monopolar membrane-electrode assembly that minimizes electrical resistance by disposing a current collecting body between a catalyst layer and a fuel diffusion portion of an electrode.

According to an aspect of the present invention, there is provided a monopolar membrane-electrode assembly, including an electrolyte membrane having a plurality of cell regions and at least one opening associated with each cell region, a plurality of anode current collecting bodies and a plurality of cathode current collecting bodies respectively formed at the cell regions on both surfaces of the electrolyte membrane, each current collecting body including a current collector collecting the currents on the cell regions, and a conductor connected to a side of the current collector, respective ends of the conductors of corresponding anode and cathode current collecting bodies being connected through the corresponding openings in series, and a plurality of anodes and a plurality of cathodes respectively formed on the anode current collecting bodies and the cathode current collecting bodies.

Each of the current collecting bodies may include: a current collector collecting the currents on the cell regions; and a conductor connected to a side of the current collector.

The electrolyte membrane may include a plurality of openings, and an end of the conductor of the cathode current collector may be electrically connected to an end of the conductor of an adjacent anode current collector through the opening in series.

The end of the conductor of the cathode current collector and the end of the conductor of the anode current collector may be located on the opening, and the opening may be filled with a conductive metal.

An end of the conductor of the cathode current collector and an end of the conductor of the anode current collector may be exposed out of the electrolyte membrane so that the end of the conductor of the cathode current collector and the end of the conductor of the anode current collector are electrically connected to each other in series.

The current collecting body may be formed of a first metal having an electric conductivity of 1 S/cm or larger, or a conductive high-polymer.

The first metal may be selected from the group consisting of Ag, Au, Al, Ni, Cu, Pt, Ti, Mn, Zn, Fe, Sn, and an alloy of theses metals.

A second metal may be coated on the first metal.

The second metal may be selected from the group consisting of Ag, Au, Al, Ni, Cu, Pt, Ti, Mn, Zn, Fe, Sn, and an alloy of theses metals.

The conductive high-polymer may be one selected from the group consisting of polyaniline, polypyrrole, and polythiophene.

The current collector may be formed using a sputtering method, a chemical vapor deposition (CVD) method, an electrical deposition method, a patterning method, or a metal etching method.

The current collector may be formed as a metal mesh.

The assembly may further include: an anode supporting body and a cathode supporting body formed on both surfaces of the electrolyte membrane, and respectively including a plurality of first openings corresponding to the cell regions so that the anode current collecting bodies and the cathode current collecting bodies are disposed on the first openings.

The electrolyte membrane and the supporting bodies may include a plurality of second openings, respectively, and an end of the conductor of the cathode current collecting body may be electrically connected to an end of the conductor of the adjacent anode current collecting body through the second opening in series.

The end of the conductor of the cathode current collecting body and the end of the conductor of the anode current collecting body may be located on the second opening, and the second opening may be filled with a conductive metal.

An end of the conductor of the cathode current collecting body and an end of the conductor of the anode current collecting body may be exposed out of the electrolyte membrane so that the end of the conductor of the cathode current collecting body and the end of the conductor of the anode current collecting body are electrically connected to each other in series.

The supporting body may be formed of a non-conductive polymer.

The supporting body may be formed of one selected from the group consisting of polyimide, polyethylene, polypropylene, and polyvinyl chloride.

The supporting body and the current collecting body may be integrally formed with each other to form a flexible printed circuit board (FPCB).

According to another aspect of the present invention, there is provided a monopolar membrane-electrode assembly comprising an electrolyte membrane including a plurality of cell regions and at least one opening associated with each cell region, catalyst layers formed at each of the cell regions on both surfaces of the electrolyte membrane, anode current collecting bodies and cathode current collecting bodies respectively formed on the catalyst layers, each current collecting body including a current collector collecting the currents on the cell regions, and a conductor connected to a side of the current collector, respective ends of the conductors of corresponding anode and cathode current collecting bodies being connected through the corresponding openings in series, and anode diffusion regions and cathode diffusion regions respectively formed on the anode current collecting bodies and the cathode current collecting bodies.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
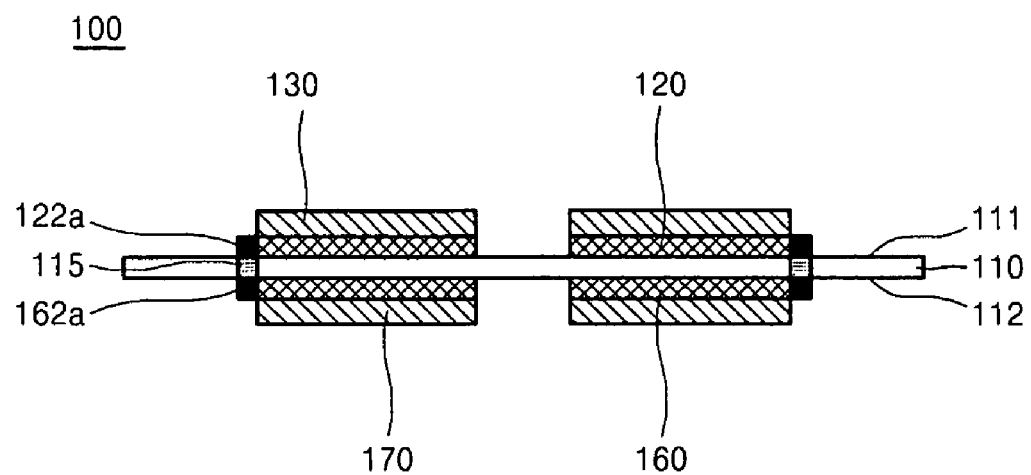
FIG. 1 is a schematic cross-sectional view of a monopolar membrane-electrode assembly including current collecting bodies according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
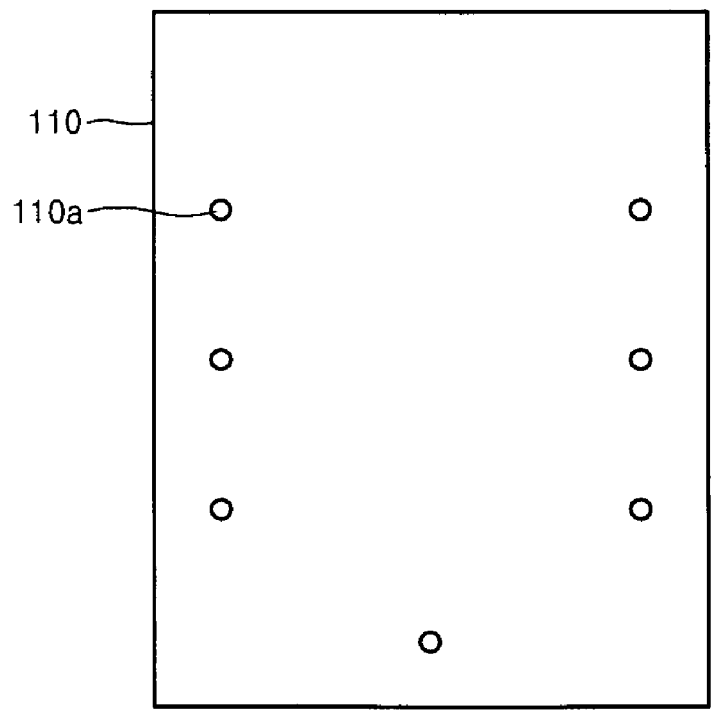
FIG. 2 is a plan view of an electrolyte membrane of FIG. 1.
Figure 3:
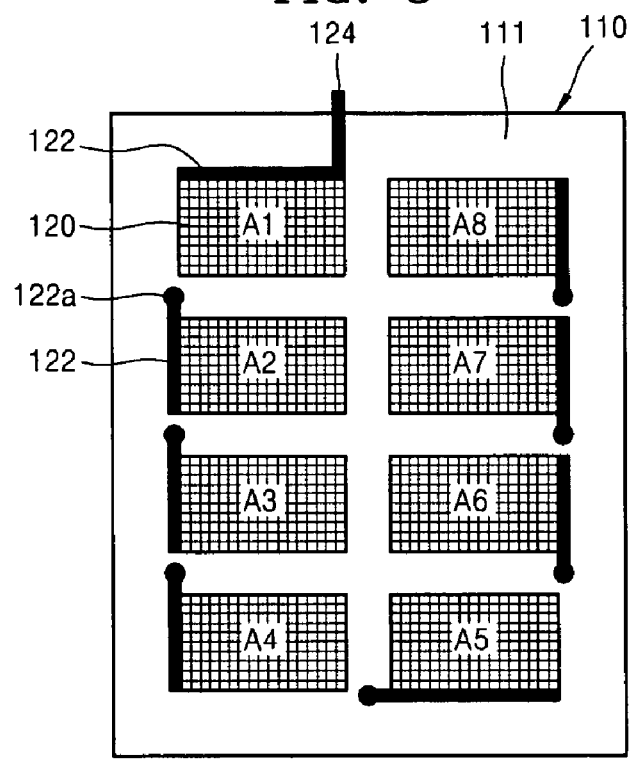
FIGS. 3 and 4 are plan views of the current collecting bodies inserted in the membrane-electrode assembly of FIG. 1.
Figure 4:
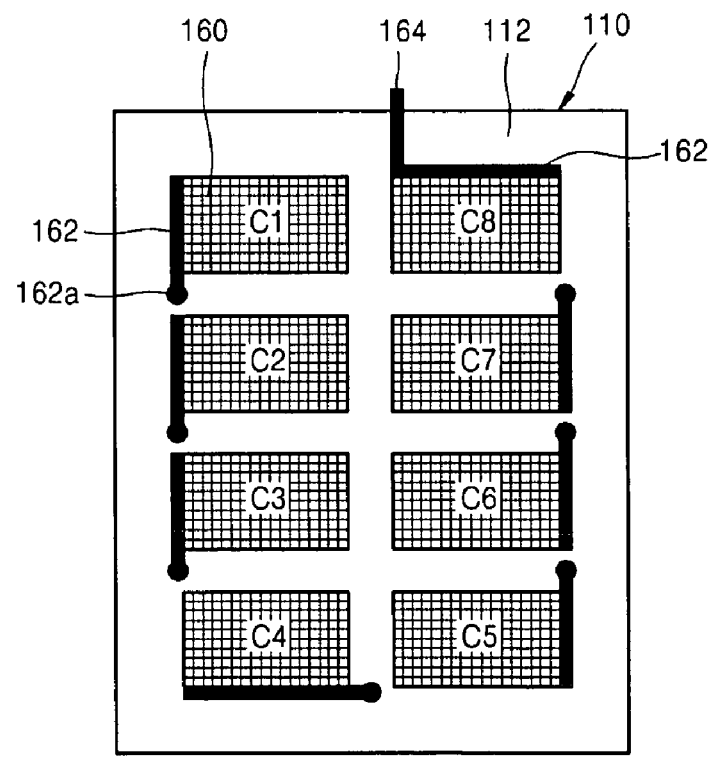

FIG. 1 is a schematic cross-sectional view of a monopolar membrane-electrode assembly including current collecting bodies according to an embodiment of the present invention, FIG. 2 is a plan view of an electrolyte membrane of FIG. 1, and FIGS. 3 and 4 are plan views of the current collecting body inserted in the membrane-electrode assembly of FIG. 1.

Referring to FIGS. 1 through 4, a monopolar membrane-electrode assembly 100 according to an embodiment of the present invention includes an electrolyte membrane 110 having a plurality of cell regions, that is, eight cell regions (first through eighth cells). Anode current collectors 120 (A1~A8) having a mesh shape are formed on each of the cell regions on a first surface 111 of the electrolyte membrane 110. A conductor 122 is formed on a side of the anode current collector 120. In addition, an anode 130 is installed on the anode current collector 120.

Cathode current collectors 160 (C1~C8) having a mesh shape is formed on each cell region on a second surface 112 of the electrolyte membrane 110. A conductor 162 is formed on a side of the cathode current collector 160. A cathode 170 is formed on the cathode current collector 160.

Together the current collector and the conductor form a current collecting body.

FIG. 3 is a plan view of the anode current collectors A1~A8, and FIG. 4 is a plan view of the cathode current collectors C1~C8 with the electrolyte membrane 110. Terminals 124 and 164 to electrically connect to an external device are connected to the conductor 122 of the anode current collector A1 and the conductor 162 of the cathode current collector C8. The terminals 124 and 164 may extend from the conductor 122 of the anode current collector A1 and the conductor 162 of the cathode current collector C8.

An end 162a of the conductor 162 of the cathode current collector C1 is electrically connected to an end 122a of the conductor 122 of the anode current collector A2 through an opening 110a (refer to FIG. 2) formed on the electrolyte membrane 110. That is, a conductive metal 115 fills in the opening 110a. As described above, the anode current collectors A2~A8 of each of the cells are electrically connected to the cathode current collectors C1~C7 through the opening 110a. Therefore, the eight cells are serially connected to each other.

The current collectors 120 and 160, the conductors 122 and 162, the conductive metal 115, and the terminals 124 and 164 may be formed of a first metal, that is, a transition metal having an electric conductivity of 1 S/cm or larger. In addition, the first metal may be coated by a second metal to prevent the first metal from corroding.

The first metal and the second metal may be formed of Ag, Au, Al, Ni, Cu, Pt, Ti, Mn, Zn, Fe, Sn, and/or an alloy of theses metals. Alternately, a conductive high-polymer material such as polyaniline, polypyrrole, and polythiophene may be used instead of the first metal.

The current collector may be formed by directly forming the first and second metals on the electrolyte membrane or by additionally forming the current collector and bonding the current collector to the electrolyte membrane. The former method includes a sputtering method, a chemical vapor deposition (CVD) method, and/or an electro-deposition method, and the latter method uses a metal thin film patterned or etched to be similar to the shape of the current collecting body.

In the monopolar membrane-electrode assembly 100 according to the present embodiment, the length of the conductor that connects the anode electrode 130 and the cathode electrode 170 is relatively very short since the anode electrode 130 and the cathode electrode 170 are directly connected through the hole 110a formed in the electrolyte membrane 110. Thus, the conductor has a low electrical resistance. In addition, since the anode and cathode current collectors 120 and 160 are disposed between the electrolyte membrane 110 and the catalyst layers of the anode and cathode 130 and 170, electrons generated in the catalyst layer are directly collected in the current collectors to which the catalyst layer is directly connected. Therefore, there is no electrical resistance generated in a conventional catalyst layer when the electrons produced in the catalyst layer pass through a fuel diffusion portion of the electrode and an electrode supporting body.

Figure 5:
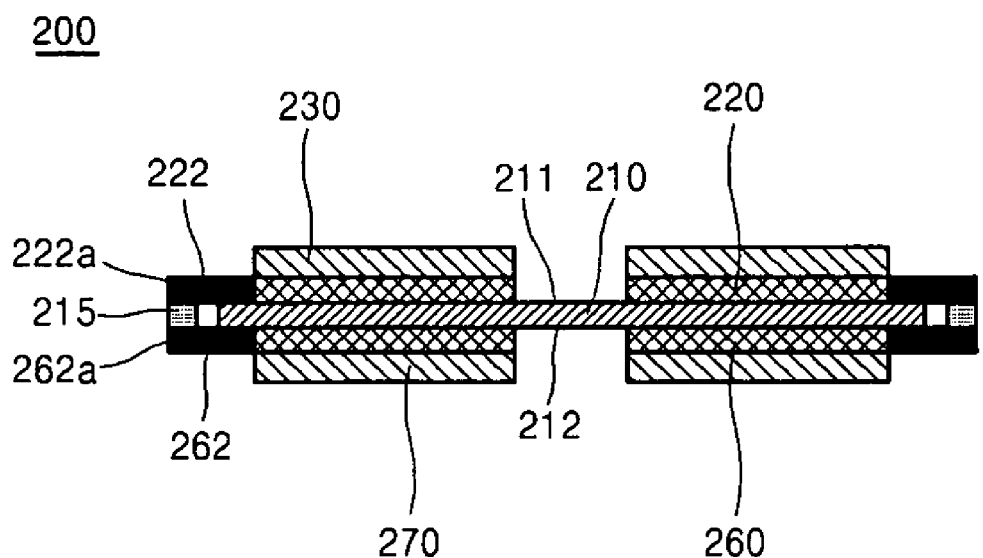
FIG. 5 is a schematic cross-sectional view of a monopolar membrane-electrode assembly according to another embodiment of the present invention.
Figure 6:
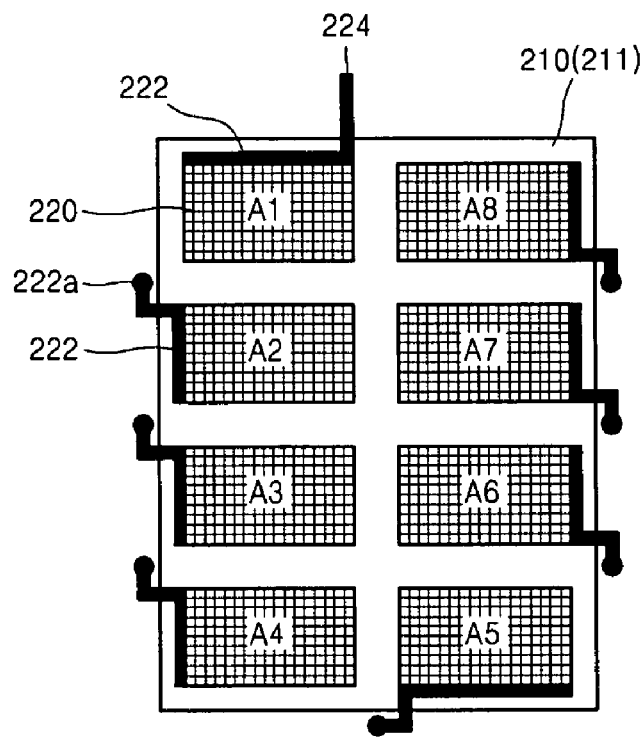
FIGS. 6 and 7 are plan views of current collecting bodies inserted in the membrane-electrode assembly of FIG. 5.
Figure 7:
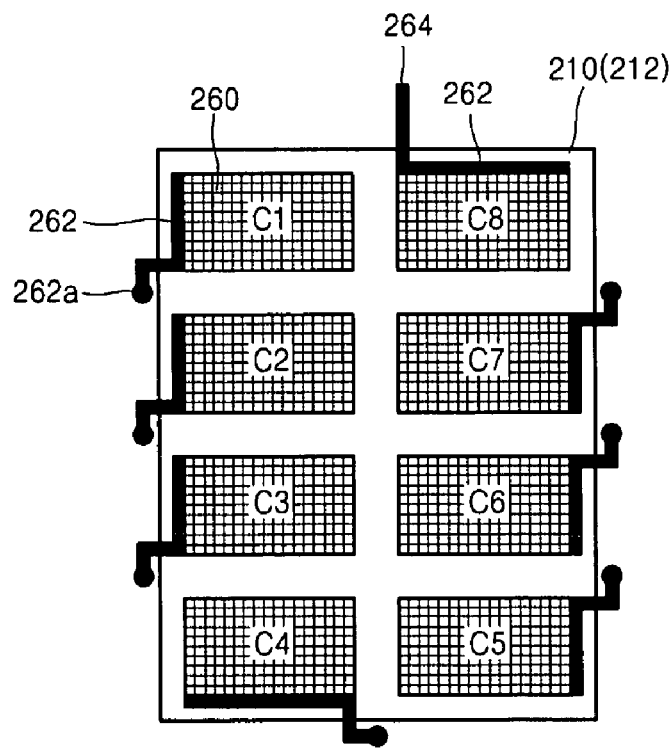

FIG. 5 is a schematic cross-sectional view of a monopolar membrane-electrode assembly 200 according to another embodiment of the present invention, and FIGS. 6 and 7 are plan views of the current collecting bodies inserted in the membrane-electrode assembly of FIG. 5. The same reference numerals denote the same elements as those of FIGS. 1 through 4, and detailed descriptions for those will be omitted.

Referring to FIGS. 5 through 7, a monopolar membrane-electrode assembly 200 according to an embodiment of the present invention includes an electrolyte membrane 210 having a plurality of cell regions, that is, eight cell regions (first through eighth cells). Anode current collectors 220 (A1~A8) having a mesh shape are formed on each of the cell regions on a first surface 211 of the electrolyte membrane 210. A conductor 222 is formed on a side of the anode current collector 220. In addition, an anode 230 is installed on the anode current collector 220.

Cathode current collectors 260 (C1~C8) having a mesh shape are formed on each cell region on a second surface 212 of the electrolyte membrane 210. A conductor 262 is formed on a side of the cathode current collector 260. A cathode 270 is formed on the cathode current collector 260.

Ends 222a and 262a of the conductors 222 and 262 are extended to an exterior of the electrolyte membrane 210. Each of the electrodes 230 and 270 includes a catalyst layer, a fuel diffusion portion, and an electrode supporting body.

FIG. 6 is a plan view of the anode current collectors A1~A8, and FIG. 7 is a plan view of the cathode current collectors C1~C8 with the electrolyte membrane. The conductor 222 of the anode current collector A1 and the conductor 262 of the cathode current collector C8 are connected to terminals 224 and 264 to electrically connect to the exterior. The terminals 224 and 264 may extend from the conductor 222 of the anode current collector A1 and the conductor 262 of the cathode current collector C8.

The end 262a of the conductor 262 of the cathode current collector C1 is electrically connected to the end 222a of the conductor 222 of the anode current collector A2 in the second cell. The ends 222a and 262a may be filled with a metal to be electrically connected to each other. The anode current collectors A2~A8 are electrically connected to the cathode current collectors C1~C7 of an adjacent cell. Therefore, the first through eighth cells are serially connected to each other.

In the monopolar membrane-electrode assembly 200 according to the present embodiment, the conductor electrically connecting the anode 230 and the cathode 270 may be relatively easily connected at the outside of the electrolyte membrane. In addition, since the anode and cathode current collectors 220 and 260 are disposed between the electrolyte membrane 210 and the catalyst layers of the anode and cathode 230 and 270, electrons generated in the catalyst layer are directly collected in the current collectors to which the catalyst layer is directly connected. Therefore, there is no electrical resistance generated in a conventional catalyst layer when the electrons produced in the catalyst layer pass through the fuel diffusion portion of the electrode and the electrode supporting body.

Figure 8:
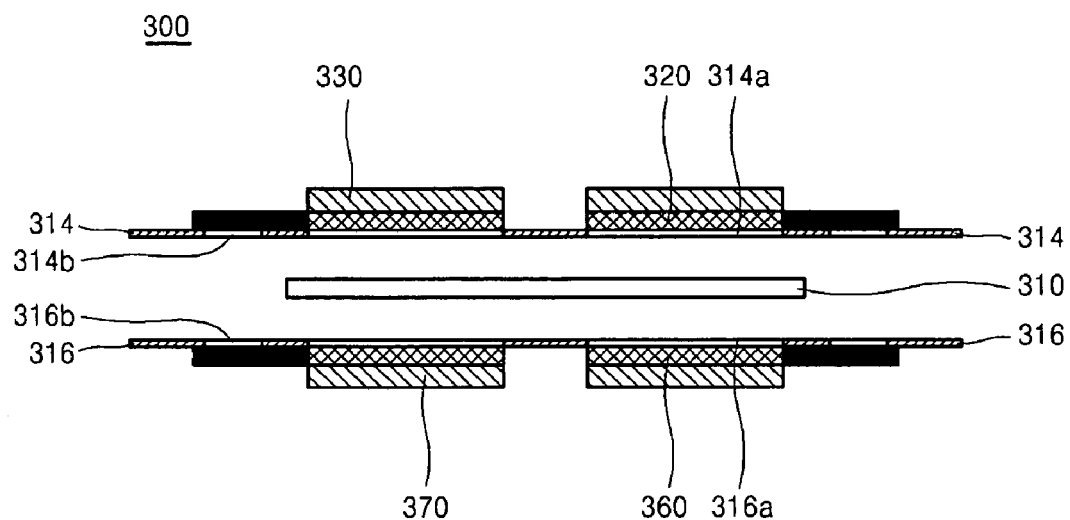
FIG. 8 is a schematic cross-sectional view of a monopolar membrane-electrode assembly, in which a current collecting body is incorporated, according to another embodiment of the present invention.
Figure 9:
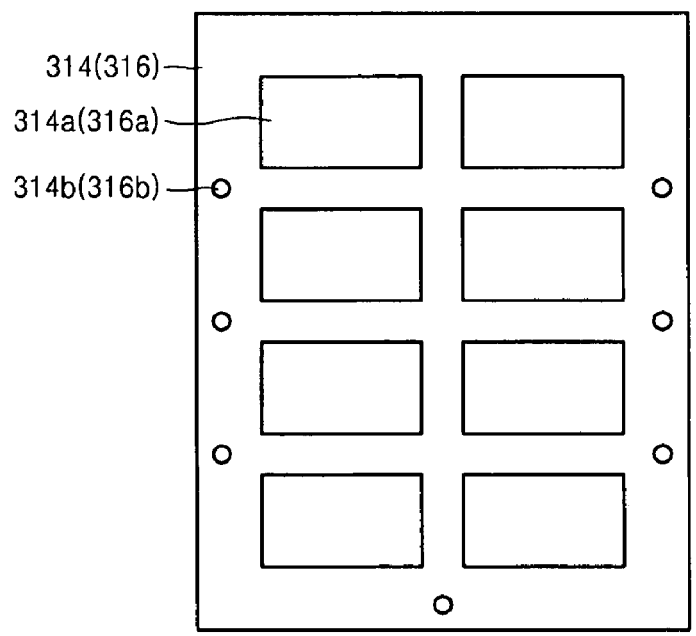
FIG. 9 is a plan view of a supporting body in FIG. 8.
Figure 10:
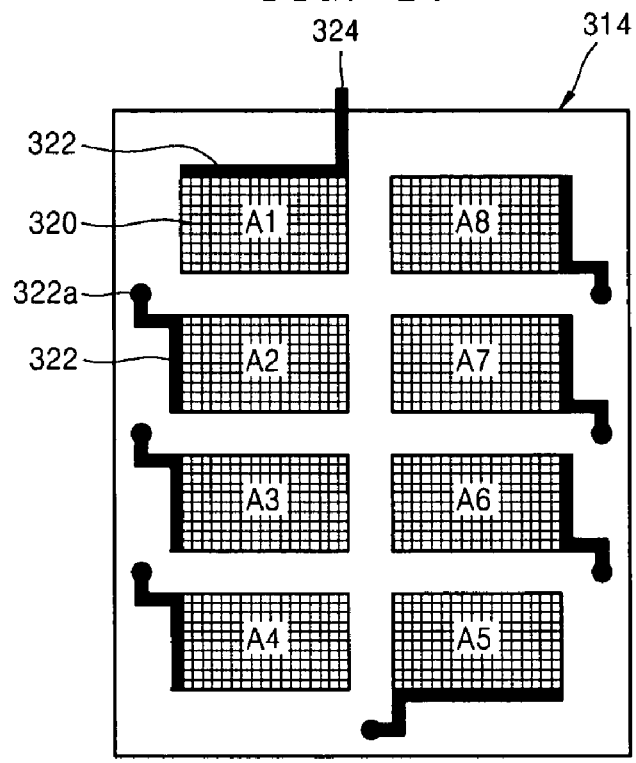
FIGS. 10 and 11 are plan view of a current collector, a conductor, and a terminal formed on the supporting body of FIG. 8.
Figure 11:
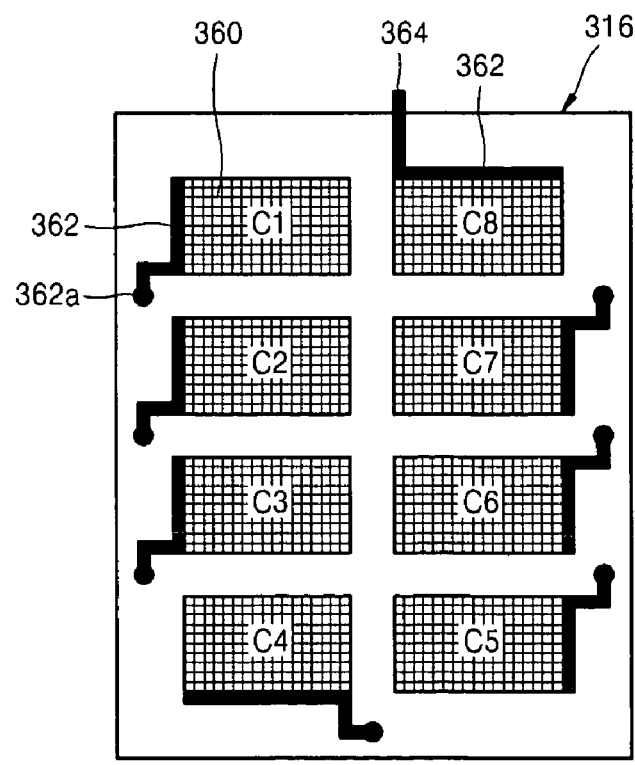

FIG. 8 is a schematic cross-sectional view of a monopolar membrane-electrode assembly, in which a current collecting body is combined, according to another embodiment of the present invention, FIG. 9 is a plan view of a supporting body in FIG. 8, and FIGS. 10 and 11 are plan views of a current collector, a conductor, and a terminal formed on the supporting body of FIG. 8.

Referring to FIGS. 8 through 11, a monopolar membrane-electrode assembly 300, in which a current collector is inserted, according to an embodiment of the present invention includes an electrolyte membrane 310 having a plurality of cell regions, that is, eight cell regions (first through eighth cells). Non-conductive supporting bodies 314 and 316, each of which includes a plurality of square openings 314a and 316a on portions corresponding to the cell regions, for example, polyimide films, are disposed on both surfaces of the electrolyte membrane 310. The supporting bodies 314 and 316 extend to outside of the electrolyte membrane 310, and a plurality of openings 314b and 316b are formed on the extended regions of the supporting bodies 314 and 316. In each of the cell regions of the supporting bodies 314 and 316, anode current collectors 320 (A1~A8) and cathode current collectors 360 (C1~C8) are formed. An anode 330 and a cathode 370 are respectively formed on the anode collector 320 and the cathode collector 360.

Each of electrodes 330 and 370 includes a catalyst layer, a fuel diffusion portion, and an electrode supporting body.

The non-conductive supporting bodies 314 and 316 may be formed of a polyethylene or a polypropylene or a polyvinyl chloride.

The anode current collectors 320 (A1~A8) and the cathode current collectors 360 (C1~C8) may be formed in various shapes (i.e., the mesh type). A conductor 322 is formed on a side of the anode current collector 320, and a conductor 362 is formed on a side of the cathode current collector 360. A cathode 370 is installed on the cathode current collector 360.

FIG. 10 is a plan view of the anode current collecting bodies including the anode current collectors A1~A8, and FIG. 11 is a plan view of the cathode current collecting bodies including the cathode current collectors C1~C8.

FIGS. 10 and 11 show a flexible printed circuit board (FPCB) formed by installing the current collecting bodies formed of the conductive metal on the polyimide films 314 and 316. In this case, the current collecting bodies are integrally formed with the polyimide films 314 and 316, and then, bonded to the electrolyte membrane.

The conductor 322 connected to the anode current collector A1 and the conductor 362 connected to the cathode current collector C8 are connected to terminals 324 and 364 to electrically connect to the exterior, respectively. The terminals 324 and 364 may extend from the conductor 322 connected to the anode current collector A1 and the conductor 362 connected to the cathode current collector C8.

An end 362a of the conductor 362 of the cathode current collector C1 of the first cell is located on the opening 316b formed on the supporting body 316, and an end 322a of the conductor 322 of the anode collector A2 of the second cell is located on the opening 314b formed on the supporting body 314. The supporting body 316, on which the cathode current collectors 360, the conductors 362, and the terminal 364 are formed, is disposed between the cathode 370 and the electrolyte membrane 310. In addition, the supporting body 314, on which the anode current collectors 320, the conductors 322, and the terminal 324 are formed, is disposed between the anode 330 and the electrolyte membrane 310. Then, a hot-pressing operation is performed in a status where the openings 314b and 316b formed on the supporting bodies 314 and 316 are arranged at a temperature of 125° C. with 3 tons of pressure for three minutes. After that, the ends 322a and 362a of the conductors 322 and 362 are electrically connected to each other by bonding the ends 322a and 362a using a spot welding method or an ultrasonic welding method. As described above, the anode current collectors A2~A8 of each of the cells are electrically connected to the cathode current collectors C1~C7 of adjacent cells through the openings 314b and 316b. Therefore, the first through eighth cells are serially connected to each other.

The current collectors 320 and 360, the conductors 322 and 362, and the terminals 324 and 364 may be formed of a first metal, that is, a transition metal having an electric conductivity of 1 S/cm or larger. In addition, the first metal may be coated by a second metal for preventing the first metal from corroding.

The first metal and the second metal can be formed of Ag, Au, Al, Ni, Cu, Pt, Ti, Mn, Zn, Fe, Sn, and/or an alloy of theses metals. Alternately, a conductive high-polymer material such as polyaniline, polypyrrole, and polythophene may be used instead of the first metal.

In the monopolar membrane-electrode assembly 300 according to the present embodiment, the length of the conductors 322 and 362 that connect the anode current collector 320 and the cathode current collector 360 is relatively very short since the conductors 322 and 362 are directly connected to each other through the openings 314b and 316b formed on the supporting bodies 314 and 316. Thus, the conductors have a low electrical resistance. In addition, since the current collectors 320 and 360 are formed between the electrolyte membrane 310 and the catalyst layers, there is no electrical resistance generated when the electrons produced in the catalyst layer pass through the fuel diffusion portion of the electrode and the electrode supporting body.

Figure 12:
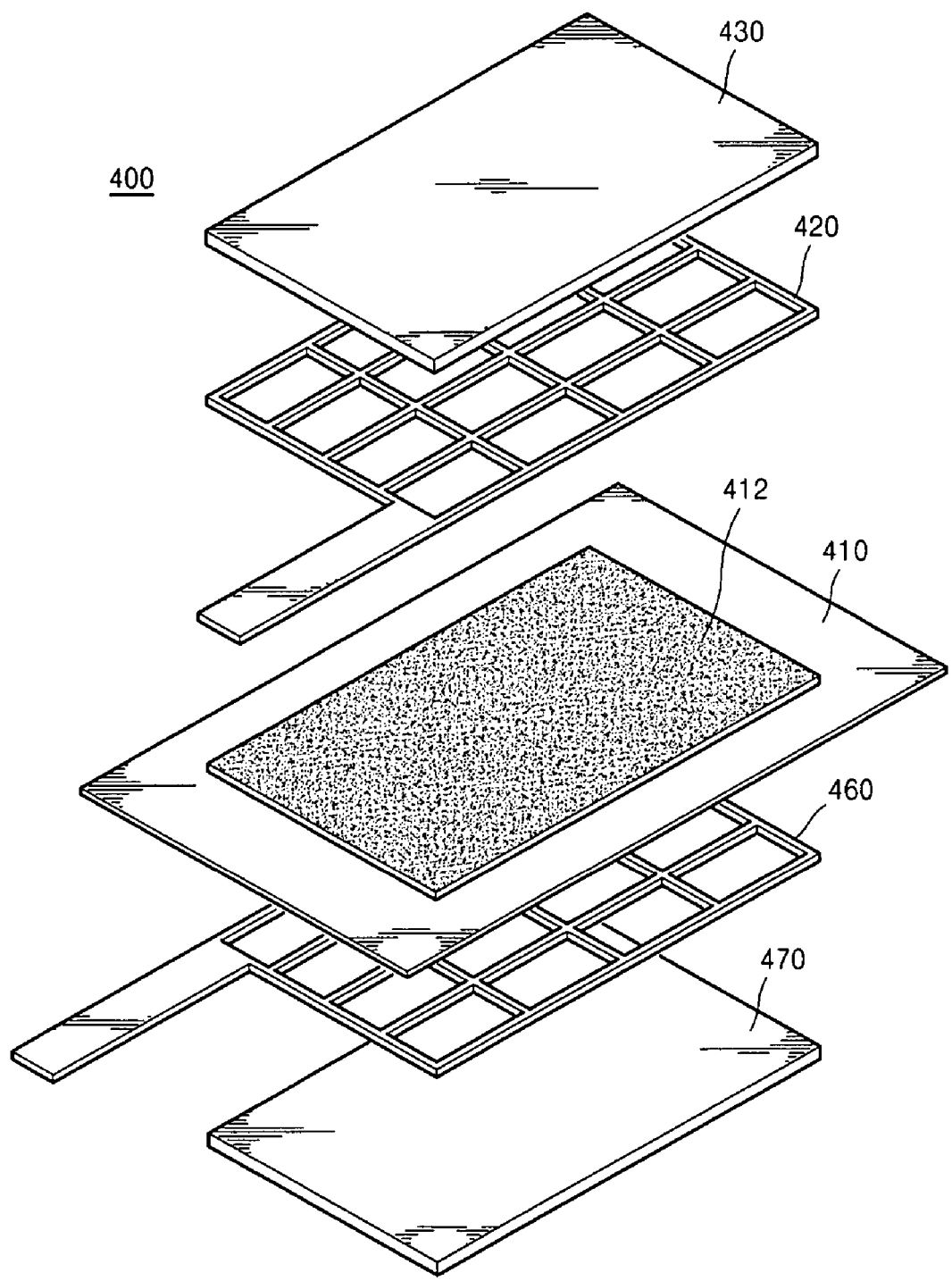
FIG. 12 is a schematic exploded perspective view of a membrane-electrode assembly including a current collecting body according to another embodiment of the present invention.

FIG. 12 is a schematic exploded perspective view of a monopolar unit cell membrane-electrode assembly 400 according to another embodiment of the present invention. Referring to FIG. 12, in the membrane-electrode assembly 400, an anode current collector 420 and a cathode current collector 460 are inserted between a catalyst layer 412 and a fuel diffusion portion of an electrode supporting body 430 and 470. Catalyst layers 412 are formed on both surfaces of the electrolyte membrane 410 using a decal method, a screen printing method, or a direct coating method, and, then, the current collectors 420 and 460 and the fuel diffusion portion and the electrode supporting body 430 and 470 are formed on the catalyst layers 412. Then, the above product undergoes a hot-pressing process to complete the electrolyte membrane-electrode assembly, in which the current collectors are incorporated.

The electrolyte-electrode assembly, in which electrodes are formed on an electrolyte membrane 410, may be fabricated using similar processes as described above. The current collecting bodies that are electrically connected to each other in series, a plurality of fuel diffusion portions, and a plurality of electrode supporting bodies are bonded on a catalyst coated membrane (CCM), which is formed by forming a plurality of catalyst layers on both surfaces of the electrolyte membrane, using the hot-pressing method, and then, the membrane-electrode assembly, in which a plurality of electrodes are connected in series, can be formed.

Figure 13:
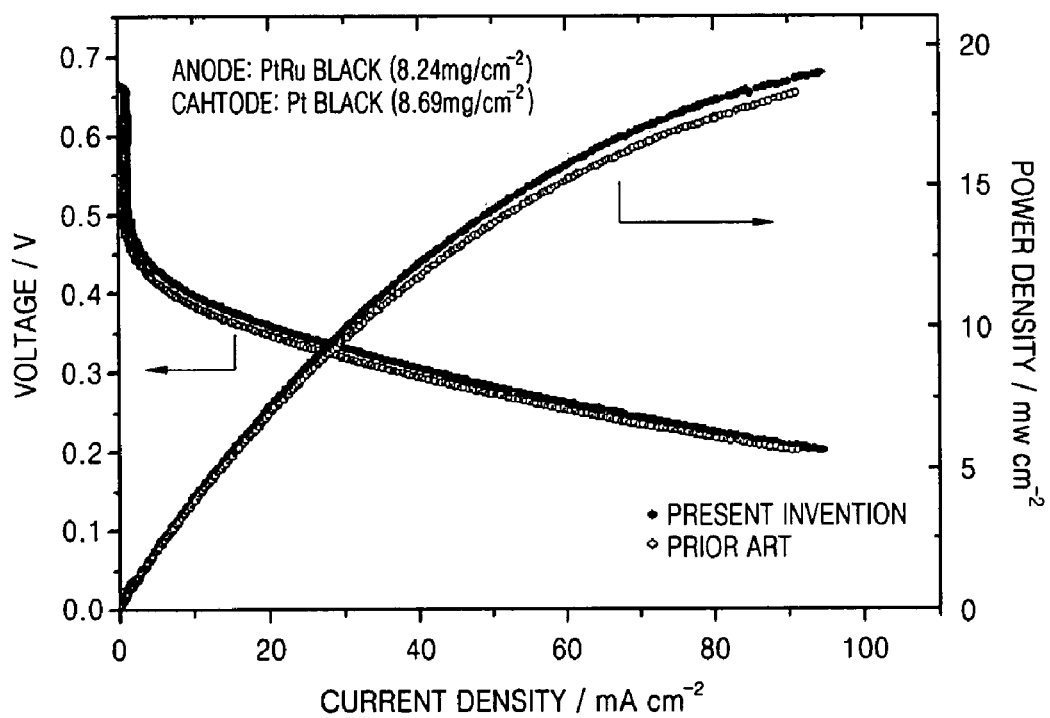
FIG. 13 is a graph showing the comparison of performance between a unit fuel cell including a membrane-electrode assembly in which a current collecting body is inserted between an electrolyte and a catalyst layer according to an embodiment of the present invention and a conventional unit fuel cell that uses an Ni-mesh current collector disposed on an electrode.

FIG. 13 is a graph showing a performance of a unit fuel cell having a structure in which current collecting bodies are inserted between an electrolyte membrane and a catalyst layer according to an embodiment of the present invention and a performance of a conventional unit fuel cell that uses a Ni-mesh current collector disposed on an electrode. At an output voltage of 0.3V, the current density value when the Ni-mesh is used is 37 mA/cm$^2$, but the current value when the current collector is inserted between the electrolyte membrane and the catalyst layer is 42 mA/cm$^2$. The current density value is improved by approximately 13%. That is, the performance of the unit fuel cell is improved since the electrical resistance decreases when the currents are collected at the catalyst layer that generates electrons as compared to the electrical resistance when the current is collected from the current collectors on the electrodes.

Figure 14:
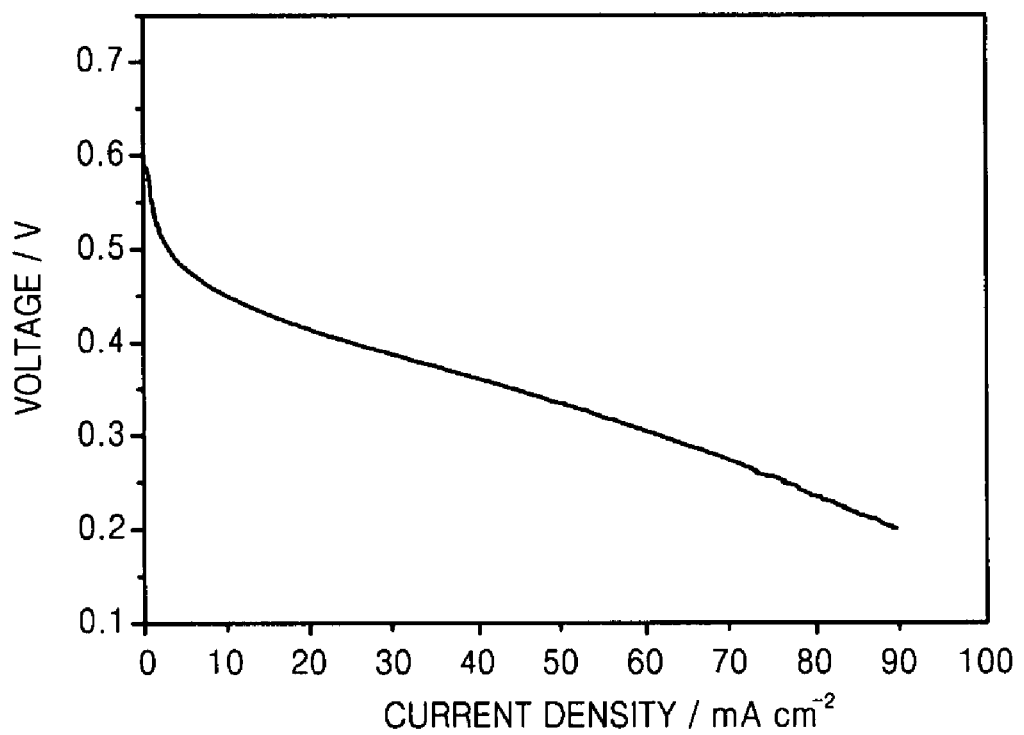
FIG. 14 is a graph showing the performance of a unit fuel cell including the membrane-electrode assembly having current collecting body inserted between a catalyst layer and a fuel diffusion portion manufactured according to an embodiment of the present invention.

FIG. 14 is a graph showing a performance of a unit cell having a current collector inserted between a catalyst layer and a fuel diffusion portion manufactured according to an embodiment of the present invention. As shown in FIG. 14, a single direct methanol fuel cell has an open circuit voltage of 1 V or less and an actual operating voltage of 0.3 to 0.5V. Therefore, to obtain a high voltage, a plurality of unit cells connected in series are required.

Figure 15:
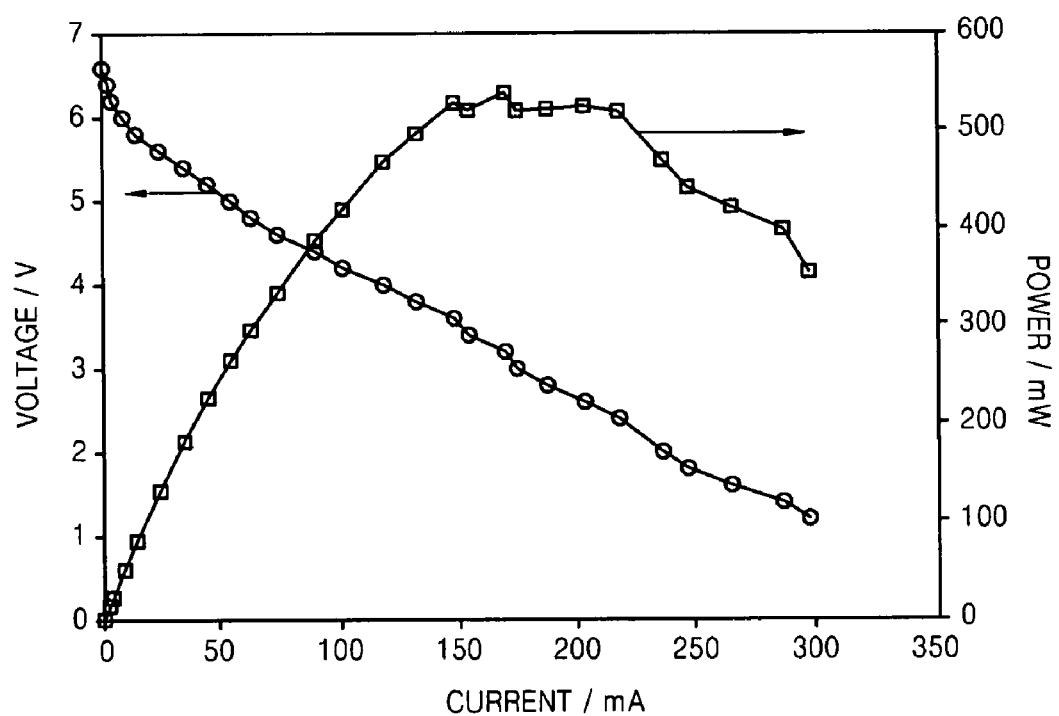
FIG. 15 is a graph showing the performance of the fuel cell including 12-cell membrane-electrode assembly, in which the current collecting body is inserted, according to the embodiment of the present invention.

In the present invention, a twelve-cell membrane-electrode assembly in which twelve electrodes, each of which has an area of 2.2 cm×1.1 cm, are connected in series on an electrode membrane is manufactured. After a flexible printed circuit board (FPCB) having twelve cells connected in series is inserted between the CCM and fuel diffusion portions, the manufacturing of the twelve cell membrane-electrode assembly is completed by hot pressing the resultant product with a pressure of 3 metric tons at a temperature of 140° C. FIG. 15 illustrates a result of measuring the performance of the 12-cell membrane-electrode assembly, and FIG. 16 illustrates electric power density according to the time.

Referring to FIG. 15, at an output voltage of 3.6V (0.3 V per cell), the current of 145.2 mA (60 mA/cm$^2$) is obtained. That is, an output of 528 mW is obtained. Maximum output is 544 mW with a current of 162.5 mA (67 mA/cm$^2$) at an output voltage of 3.35V. To obtain a high operating voltage, plural cells are connected in series. In this case, the electrical resistance and the failure of cell connection are increased. However, the electrical resistance may be reduced and the yield may be increased when the current collecting bodies of the present invention are used.

Figure 16:
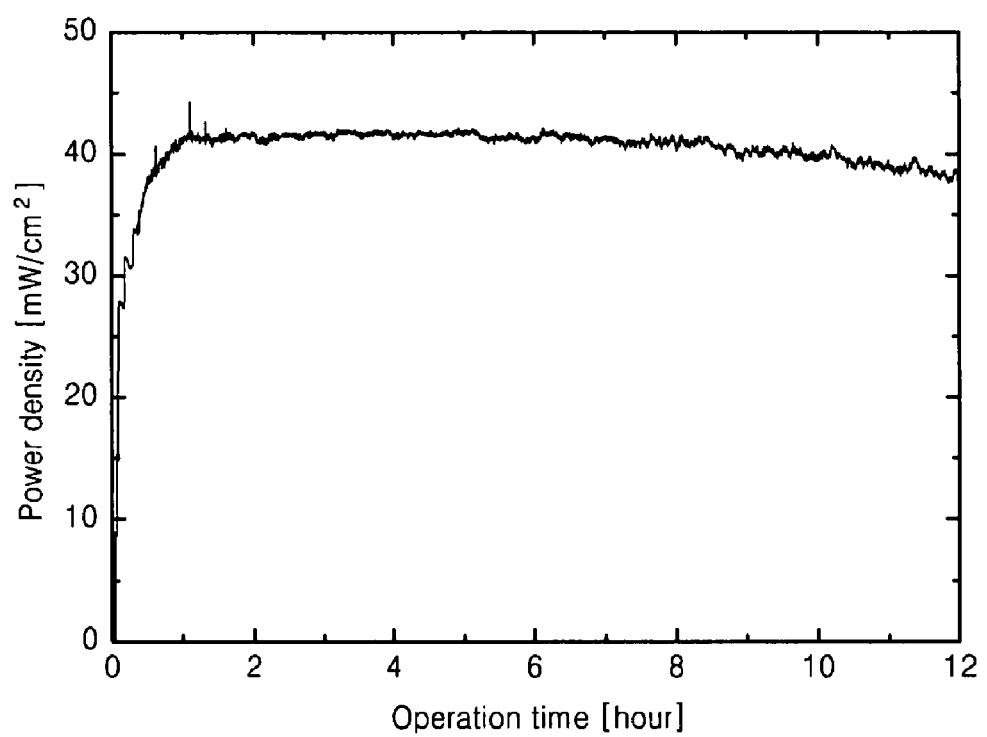
FIG. 16 is a graph showing a power density of the fuel cell of FIG. 15 according to the time.
Figure 13:
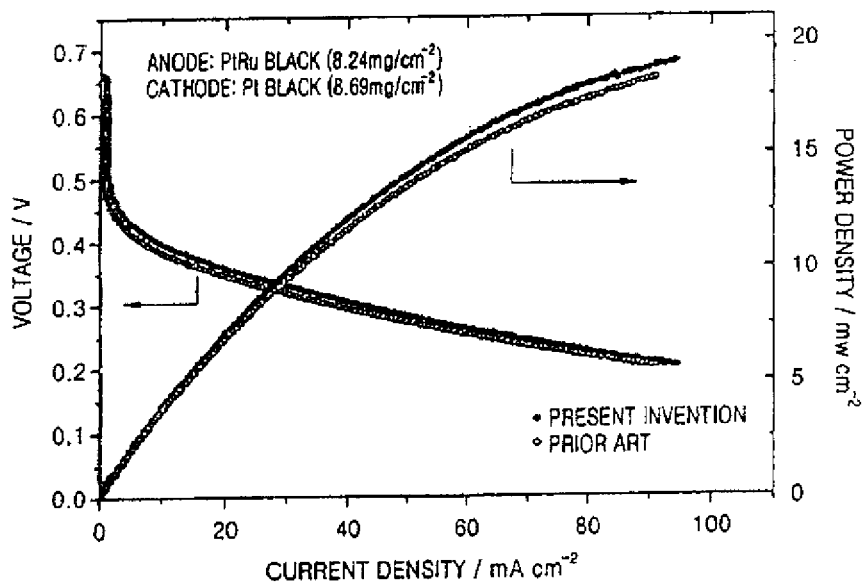

Referring to FIG. 16, the power density of the fuel cell according to the present invention is relatively good, that is, about 40 mW/cm$^2$.

According to aspects of the monopolar membrane-electrode assembly of the present invention, the length of the conductor between the current collectors is short, and the current collectors directly contact the catalyst layers, where the electrons are generated. Thus, the electrical resistance thereof may be lowered, and the efficiency of the fuel cell may be improved. In addition, since the current collectors are not installed between the fuel and the electrodes, the fuel may flow easily. Also, while the liquid fuel may leak through the mesh in the conventional mesh type structure, according to aspects of the present invention, since the current collectors exist between the membrane and the electrodes as thin films, the liquid fuel hardly leaks.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A monopolar membrane-electrode assembly, comprising:
   an electrolyte membrane having a first surface and a second surface opposite the first surface, a plurality of cell regions, and at least one opening associated with each cell region;
   a plurality of anode current collecting bodies formed at the cell regions on the first surface of the electrolyte membrane, a plurality of cathode current collecting bodies formed at the cell regions on the second surface of the electrolyte membrane, each current collecting body including a current collector collecting the currents on the cell regions, and a conductor connected to a side of the current collector, respective ends of the conductors of corresponding anode and cathode current collecting bodies being connected through the corresponding openings in series;
   a plurality of anodes formed on the surface of the anode current collecting bodies opposite the electrolyte membrane; and
   a plurality of cathodes formed on the surface of the cathode current collecting bodies opposite the electrolyte membrane.

2. The assembly of claim 1, wherein the ends of each of the conductors of the cathode current collectors and the ends of each of the conductors of the anode current collectors are located at the corresponding openings, and the openings are filled with a conductive metal.

3. The assembly of claim 1, wherein each current collecting body is formed of a first metal having an electric conductivity of 1 S/cm or larger, or a conductive high-polymer.

4. The assembly of claim 3, wherein the first metal is selected from the group consisting of Ag, Au, Al, Ni, Cu, Pt, Ti, Mn, Zn, Fe, Sn, and an alloy of these metals.

5. The assembly of claim 3, wherein a second metal is coated on the first metal.

6. The assembly of claim 5, wherein the second metal is selected from the group consisting of Ag, Au, Al, Ni, Cu, Pt, Ti, Mn, Zn, Fe, Sn, and an alloy of these metals.

7. The assembly of claim 4, wherein the conductive high-polymer is one selected from the group consisting of polyaniline, polypyrrole, and polythiophene.

8. The assembly of claim 1, wherein each current collector is formed using a sputtering method, a chemical vapor deposition (CVD) method, an electrical deposition method, a patterning method, or a metal etching method.

9. The assembly of claim 1, wherein each current collector is formed as a metal mesh.

10. The assembly of claim 1, further comprising an anode supporting body formed on the first surface of the electrolyte membrane and a cathode supporting body formed on the second surface of the electrolyte membrane, each of the anode supporting body and the cathode supporting body including a plurality of first openings corresponding to the cell regions so that the anode current collecting bodies and the cathode current collecting bodies are disposed on the first openings.

11. The assembly of claim 10, wherein the electrolyte membrane and each of the supporting bodies include a plurality of second openings, respectively, and an end of one of the conductors of one of the cathode current collecting bodies is electrically connected in series to an end of one of the conductors of one of the corresponding anode current collecting bodies through one of the second openings.

12. The assembly of claim 11, wherein the end of the one of the conductors of the one of the cathode current collecting bodies and the end of the one of the conductors of the one of the corresponding anode current collecting bodies are located on one of the second openings, and each of the second openings is filled with a conductive metal.

13. The assembly of claim 10, wherein an end of one of the conductors of one of the cathode current collecting bodies and an end of one of the conductors of one of the anode current collecting bodies are exposed out of the electrolyte membrane so that the end of the one of the conductors of the one of the cathode current collecting bodies and the end of the one of the conductors of the one of the corresponding anode current collecting bodies are electrically connected to each other in series.

14. The assembly of claim 10, wherein each of the current collectors is formed of a first metal having an electric conductivity of 1 S/cm or larger, or a conductive high-polymer.

15. The assembly of claim 14, wherein the first metal is selected from the group consisting of Ag, Au, Al, Ni, Cu, Pt, Ti, Mn, Zn, Fe, Sn, and an alloy of these metals.

16. The assembly of claim 14, wherein a second metal is coated on the first metal.

17. The assembly of claim 16, wherein the second metal is selected from the group consisting of Ag, Au, Al, Ni, Cu, Pt, Ti, Mn, Zn, Fe, Sn, and an alloy of these metals.

18. The assembly of claim 14, wherein the conductive polymer is one selected from the group consisting of polyaniline, polypyrrole, and polythiophene.

19. The assembly of claim 10, wherein each of the supporting bodies is formed of a nonconductive polymer.

20. The assembly of claim 19, wherein each of the supporting bodies is formed of one selected from the group consisting of polyimide, polyethylene, polypropylene, and polyvinyl chloride.

21. The assembly of claim 19, wherein each of the supporting bodies and each of the current collecting bodies are integrally formed with each other to form a flexible printed circuit board (FPCB).

22. The assembly of claim 10, wherein each of the current collectors is formed using a sputtering method, a chemical vapor deposition (CVD) method, an electrical deposition method, a patterning method, or a metal etching method.

23. A fuel cell comprising the monopolar membrane-electrode assembly of claim 1.

* * * * *

UNITED STATES PATENT AND TRADEMARK OFFICE
CERTIFICATE OF CORRECTION

Page 1 of 2

PATENT NO. : 8,003,275 B2
APPLICATION NO. : 11/438270
DATED : August 23, 2011
INVENTOR(S) : Kyoung Hwan Choi et al.

It is certified that error appears in the above-identified patent and that said Letters Patent is hereby corrected as shown below:

In the Drawings

Sheet 8 of 11, FIG. 13.    Delete Drawing Sheet 8 and substitute therefore the Drawing Sheet, consisting of FIG. 13, as shown on the attached page.

Delete "CAHTODE"
Insert -- CATHODE --

Signed and Sealed this
Thirty-first Day of July, 2012

David J. Kappos
*Director of the United States Patent and Trademark Office*